US011535451B2

(12) United States Patent
Soto Arriaza (10) Patent No.: US 11,535,451 B2
(45) Date of Patent: Dec. 27, 2022

(54) AUTONOMOUS ROBOTIC SYSTEM FOR AUTOMATICALLY MONITORING THE STATE OF SHELVES IN SHOPS

(71) Applicant: PONTIFICIA UNIVERSIDAD CATOLICA DE CHILE, Santiago (CL)

(72) Inventor: Alvaro Marcelo Rodrigo Soto Arriaza, Santiago (CL)

(73) Assignee: PONTIFICIA UNIVERSIDAD CATOLICA DE CHILE, Santiago (CL)

( * ) Notice: Subject to any disclaimer, the term of this patent is extended or adjusted under 35 U.S.C. 154(b) by 256 days.

(21) Appl. No.: 16/958,893

(22) PCT Filed: Dec. 19, 2018

(86) PCT No.: PCT/CL2018/050135
§ 371 (c)(1),
(2) Date: Jun. 29, 2020

(87) PCT Pub. No.: WO2019/126888
PCT Pub. Date: Jul. 4, 2019

(65) Prior Publication Data
US 2020/0339354 A1 Oct. 29, 2020

(30) Foreign Application Priority Data
Dec. 28, 2017 (CL) .................................. 3463-2017

(51) Int. Cl.
*G06F 7/00* (2006.01)
*B65G 1/137* (2006.01)

(52) U.S. Cl.
CPC ...... *B65G 1/1375* (2013.01); *B65G 2203/044* (2013.01)

(58) Field of Classification Search
CPC ............ B65G 1/1375; B65G 2203/044; B65G 2203/041; G05D 1/0248; G05D 1/0274; G06Q 10/087
USPC .......................... 700/213–214, 218, 228, 245
See application file for complete search history.

(56) References Cited

U.S. PATENT DOCUMENTS

| | | | |
|---|---|---|---|
| 2018/0120116 A1* | 5/2018 | Rombouts | G05D 1/0274 |
| 2018/0267540 A1* | 9/2018 | Sonoura | G05D 1/0221 |
| 2019/0087772 A1* | 3/2019 | Medina | B64C 39/024 |
| 2019/0177086 A1* | 6/2019 | Mathi | B65G 1/10 |

* cited by examiner

*Primary Examiner* — Yolanda R Cumbess
(74) *Attorney, Agent, or Firm* — Ladas & Parry LLP (57) ABSTRACT

An autonomous robotic system, and method for automatically monitoring the state of shelves in stores, like retail stores or supermarkets are based on a mobile The mobile robot is capable of autonomously navigating the aisles of a store, with the ability to monitor the condition of product shelves. Specifically, the robotic system solves problems associated with the operation of the shelves, mainly with respect to the detection of incorrect or missing price signs, verification of offer signs, detection of product stock, estimation of product layout, and identification of products misplaced or with errors in the spatial extent assigned to the supplier on a shelf.

21 Claims, 4 Drawing Sheets

Prediction: $1899 -Certainty 0.9999

Prediction: $1999 -Certainty 0.9866

Prediction: $3590 -Certainty 0.6753

Prediction: $1449 -Certainty 0.9041

Figure 6 though some of these solutions allow operators to be assisted in inventory

AUTONOMOUS ROBOTIC SYSTEM FOR AUTOMATICALLY MONITORING THE STATE OF SHELVES IN SHOPS

RELATED APPLICATION

This application is an application under 35 U.S.C. 371 of International Application No. PCT/CL2018/050135 filed on 19 Dec. 2018, which claims priority from Chilean Application No. 3463-2017 filed on 28 Dec. 2017, the disclosures of which are incorporated in their entirety by reference herein.

This application relates to an autonomous robotic system for automatically monitoring the state of shelves in stores, e.g. in retail stores, supermarkets, etc.

The main object of the invention is to provide a mobile robot capable of autonomously navigating the aisles of a store, with the ability to monitor the condition of product shelves. Specifically, the robotic system of the invention solves problems associated with the operation of the shelves, mainly with respect to the detection of incorrect or missing price signs, verification of offer signs, detection of product stock, estimation of product layout, and identification of products misplaced or with errors in the spatial extent assigned to the supplier on a shelf.

Additionally, the invention relates to a method of operating the autonomous robotic system for automatically monitoring the state of shelves in stores.

BACKGROUND OF THE INVENTION

Currently, the monitoring of shelves or gondolas in large retail stores is mainly done manually, where operators go around the stores checking situations such as accuracy and positioning of price signs and posters of offers, lack of stock of products, verification of the space extension used by each product, or detection of misplaced products. However, the magnitude of the stores, the thousands of products available, as well as the thoroughness required, makes manual solutions inefficient and inaccurate.

Among the solutions aimed at solving the above problems there are electronic labels for the products on shelves. However, such a solution involves a high investment cost and the high failure rates have limited its application. Additionally, this technology only aims at a partial solution to the problem of shelf monitoring as it only focuses on the problem of price tags.

An additional complication of shelf monitoring is that each store is affected by various changes in its layout or product planogram on a weekly basis, which are difficult to record correctly generating problems both in the management of the store as well as in the relationship with suppliers that rent display surfaces in shelves. There have been attempts to solve the problem by installing cameras to remotely monitor the shelves from monitoring rooms by operators. However, such solutions are expensive, complex to install and maintain, and not scalable to the size of an entire store. Along the same line, solutions have recently been developed for automatic recognition of situations such as detecting product stock-outs using video cameras. However, high installation and maintenance costs have undermined the massive adoption of such a strategy.

In terms of robots for retail, there are currently robotic solutions aimed at assisting customers who visit stores, providing the ability to read product codes and the ability to find the products that customers are looking for, by going to the place where the product is located. In addition, some of these solutions allow operators to be assisted in inventory review tasks based on information from the inventory database held by the store. However, such solutions have not shown the ability to scale to the requirements of an entire store and more importantly have not proven to be an effective and comprehensive solution to the various challenges and tasks involved in monitoring product shelves in retail stores.

In this context, document WO 2017/083424 A1 from Simbe Robotics, Inc. discloses a robot for stock-out detection, that is, to identify empty spaces on the shelves that are indicators of a product's lack of stock. The document only focuses on stock-out detection and does not indicate methods for solving other shelf monitoring problems. According to this document, in order to determine out-of-stock the robot identifies an empty shelf space, which is an indicator of out-of-stock, and uses information from the store planogram, i.e. how the products are placed on the store shelves, to identify which product caused the out-of-stock based on the information in the planogram. In other words, the robot described in document WO 2017/083424 A1 does not directly identify the products, but indirectly infers the correspondence between empty space and product through the planogram information. Such a feature results in a disadvantage, since although the planogram of the products on the shelves of a store may be known and provided to the robot by an operator in advance, usually such planogram changes over time and stores do not have an updated version of it. Therefore, the solution in WO 2017/083424 A1 will only be useful if an updated planogram of the store is available, since not having it could result in incorrect identification of a product.

Additionally, the robot described in document WO 2017/083424 A1 identifies the absence and presence of products in the images using their visual appearance, differentiating an empty space from one that is not. This is also a disadvantage since the robot described in the prior art does not allow identifying intermediate stock situations, where the relationship between empty space and product stock quantity depends on the type of product and its way of stacking, side by side, one on top of the other, etc. Thus, this robot is not capable of accurately detecting a reduced stock situation and alerting the stockholders in advance of a stock shortage.

Additionally, WO 2017/083424 A1 highlights the definition of waypoints or reference points to guide shelf monitoring, i.e., specific areas of the store that need to be monitored. Such waypoints are used by the prior art to define a navigation plan in advance, including priority information, which allows prioritizing the order in which the points are visited, in particular, visiting first the points with products most likely to be out of stock, for example. While this strategy allows you to prioritize the items most likely to be out of stock, it does not privilege and therefore ensures full coverage of the store by monitoring the condition of all its shelves. In addition, the navigation approach employed in the prior art focuses on meeting waypoints or reference points, and does not guarantee spatial coverage of the store.

Additionally, U.S. Pat. No. 7,693,757 B2 of the company IBM describes a system and method aimed at taking inventory of a store by means of a mobile robot. The document states that the robot captures images of store shelves in order to identify a code that can be associated with a product, to compare that code with a product database and to retrieve an image of the product associated with that code. Then, this image of the product associated to the captured code is compared with the image of the product from the images captured by the robot. In case the comparison shows that the recovered and captured product images do not fit, an outof-stock alert is sent. Considering the above, the solution described in U.S. Pat. No. 7,693,868 B2 has the disadvantage that the robot does not directly read the products on the shelves, but it extracts a product code to obtain a predetermined and stored image of the product, and then compares that image with the image of the shelf. This indirect approach to identify the product does not deal with situations where incorrect or missing codes are presented on the shelves, so in these cases the method proposed in U.S. Pat. No. 7,693,757 B2 does not perform a correct identification and therefore a correct determination of the conditions of the eventual lack of stock. It should be mentioned that the presence of incorrect or missing codes is in itself a problem of great relevance for the monitoring of shelves, with error rates higher than 10% being common.

Like the document WO 2017/083424 A1 of Simbe Company, the solution in IBM's U.S. Pat. No. 7,693,757 B2 does not allow for identifying labeling errors or analyzing the distribution, planogram or layout of products on the shelf.

Finally, the US 2009/0094140 A1 document of NCR company describes a solution for an airborne platform that enables store inventory management by capturing images and reading prices and products. To do this, image recognition is used to extract information from product labels and product inventory, which is then compared with that contained in a database for identification and alerting of any discrepancies. While the solution in US 2009/0094140 A1 allows for the identification of discrepancies between captured and stored information, it does not allow for the generation of the current store planogram, based on stored information that does not necessarily correspond to the correct information in real time. In addition, US 2009/0094140 A1 describes the use of cameras and headlights or beacons arranged in the store to determine the positioning of the aerial platform. In this way, this solution resorts to a modification of the environment, introducing an artificial location system for the robot. This makes the navigation system more complex and introduces problems associated with maintaining the structural changes of the store.

Therefore, the existence of a completely autonomous robotic system is necessary, which can navigate in a store without the need to intervene the store including icons or beacons, and which is capable of generating information on the current conditions of distribution of products on the shelves, avoiding indirect identifications that involve difficulties given the continuous changes in the distribution of products, price tags and posters inside the store.

In addition, it is necessary to have a solution that combines visual information with distance or depth measurements, enriching the captured information with data that guarantees the correct collection of information and that allows to detect the stock of a product with a high degree of precision.

On the other hand, it is necessary to have a system capable of reading all types of signs and banners in the store, capturing relevant information from the shelves, including product logos, signs with information on aisles, price signs, offer signs, etc.

Finally, it is necessary to have an autonomous robotic system with a navigation route planning system that allows an efficient spatial coverage, including replanning techniques in case points of the store are identified that were left pending either by the presence of an obstacle or by capturing images of insufficient quality, returning to those points after the route is completed, ensuring a total coverage of the shelves to be analyzed.

Therefore, it is necessary to have a robotic system that delivers a comprehensive solution to the main problems that involve the monitoring of shelves in stores, as indicated above.

BRIEF DESCRIPTION OF THE INVENTION

In order to solve the problems existing in the solutions belonging to the prior art, the present invention relates to an autonomous robotic system for the automatic monitoring of the state of shelves in stores, capable of not only detecting the stock of products, but also identifying relevant information by incorporating capabilities for reading the information on code and price labels of products, temporary posters of offers, and logos and labels of the products on display allowing access to their direct identification. By means of these capabilities not incorporated in any previous solution, the present invention is capable of performing tasks such as detecting incorrect or missing price labels, determining the planogram of the store shelves, determining the stock of products, verifying the offer posters, and identifying products misplaced or with errors in the spatial extension assigned to the supplier on a shelf.

Store shelves should be understood as any shelf, gondola, or structure arranged for the display of products. In addition, relevant information should be understood as any information associated with identifying the stock of products, product labels and tags, including logos and information printed on product packaging, price labels and tags, including product codes, identifiers and values, temporary or permanent signs placed on the shelves. In addition, information on aisles and product distribution signs on the shelves is also considered, which allows the robot to have information pertinent to its location in the store, facilitating the operation of its autonomous navigation systems.

To this end, the invention proposes an autonomous robotic system, for the automatic monitoring of the state of shelves in stores, comprising a mobile robot formed by a body with a mobile base, where said mobile base comprises a drive system connected to movement and direction means. This mobile base may include a set of stability sensors, for example accelerometers and/or gyroscopes, to control the robot's movement in order to maintain its stability. In addition, the mobile robot comprises an upper structure arranged to house sensors, one or more processing units, comprising one or more storage means and one or more processors, communications means and other operational components of the robot, aimed at fulfilling its functions. Preferably, the upper structure of the robot is made of a strong and light material, protecting the sensitive components of the robot and keeping a low center of mass, for example, aluminum is used. In this context, the main sensors of the invention's robotic system are at least a laser sensor, at least a distance or depth or proximity sensor and at least an image sensor. In accordance with one embodiment of the invention, the body of the robot is covered by a housing, arranged to protect the components of the robot inside. This casing is made of a light and strong material, protecting the sensitive components of the robot and maintaining a low center of mass, e.g. glass fiber is used.

According to an embodiment, the communications means comprise a wireless communication link for communication of information to at least one server located in a remote position, and/or a wired communication link for communication of information to at least one server connected by cable to the robot. In addition, the communications means generate alarms and/or daily reports regarding the stock of a product, incorrect or missing relevant information regarding price tags and offers on the shelves, and/or incorrect position of a product on a shelf, and/or layout conformation and spatial extension used by each product on the shelf.

According to an embodiment of the invention, distance or proximity sensors are relevant for the detection of stock and the estimation of a product planogram, since they make it possible to identify distances or depths. In this sense, in addition to depth, such sensors allow determining useful distances to quantify the size of the products, as well as the space in the gondola that is not occupied. The information on distance is complemented with the identification of the product by reading its logos and labels, as well as the code and price on the corresponding display label. By integrating these sources of information, not only a lack of stock is accurately determined, but also intermediate situations in which there is only partial stock of a product.

On the other hand, the robotic system proposed comprises an autonomous navigation system that communicates with the sensors, mainly with the laser sensor, with the image sensor, with the distance or depth or proximity sensor. In addition, this navigation system communicates with at least one processing unit, which processes the information received to determine the robot's autonomous navigation in real time.

The laser sensor associated with the navigation system is set up to measure distances to the robot's environment using methods known from the state of the art, capturing information about the store planimetry, where this planimetry information is processed by the navigation system. This navigation system builds a map of the spatial configuration of the store and activates the movement and direction means of the robot guiding it during the navigation through the aisles of the store. This map can be two or three-dimensional depending on the characteristics of the laser sensor used, according to the known state of the art. To handle the case in which the view of this sensor is occluded by the presence of dynamic objects in the environment such as cars and people, the navigation system can be complemented with an RGB camera and an object recognition algorithm that allows identifying these objects and exclude them from the robot's position estimation.

In this context, the navigation of the robot needs a map of the store; thus, techniques known by the prior art and known as SLAM (Simultaneous Localization and Mapping) can be used. Basically, the robot has a system to locate its position on a pre-constructed map of the store's interior environment. This map is automatically constructed in a previous stage in which the robot is guided to go through the target store. Using this estimate of its position and the information on the map, the robot decides where to move. These SLAM techniques are also known as geometric, since they are based on a representation that reproduces part of the store's geometry to achieve the robot's location.

In the present solution, although pre-built maps and geometric navigation can be used, behavior-based navigation is also employed. Behavior-based navigation is based on the definition of a set of basic behaviors that the robot is able to execute without the need of an accurate knowledge of the store geometry. As an example, a "follow aisle" behavior, allows the robot to navigate from the beginning to the end of an aisle without the need to maintain an accurate estimate of its position in the aisle, but only a rough estimate of its orientation so that it advances consistently in the direction longitudinal to the aisle. In particular, the robot described in the present invention uses deep learning techniques to acquire a set of predefined behaviors through the use of imitation-based learning. Under this learning embodiment, the robot is able to acquire the desired behavior by observing successful trajectories of execution, i.e., by imitating the behavior of an expert. In this way, by identifying a set of predefined basic navigation behaviors and associating them to the spaces present in the store path, the robot can achieve a robust navigation, specially designed to overcome the complexities of spaces such as supermarkets.

Additionally, the image sensor and the proximity sensor are arranged to visualize and measure the robot's environment, capturing the display and distance information. This display and distance information is processed by the navigation system to generate dynamic navigation routes that adapt to the obstacles present in the robot's environment. In accordance with an embodiment of the invention, the image sensor and the distance or depth or proximity sensor are arranged on the front face of the robot, in order to detect obstacles in the aisles in the direction of the robot's movement, to distinguish people and supermarket carts, for example, and thus enabling the robot to dynamically generate navigation routes that allow it to avoid these obstacles.

In accordance with an embodiment of the invention, the navigation system determines the position of the robot in the store by recognizing the captured images and their association with the store. For example, the reading capabilities of the robot are used to read the signs appearing at the top of the store to indicate the information of the aisles. This allows the robot to locate itself in cases where the geometric navigation fails, which is common when the supermarket presents significant changes in its configuration, for example, on Christmas Eve or other special events, where the layout of the store changes substantially.

Apart from navigation, the robotic system of the invention also comprises a visual recognition system in communication with at least one image sensor, at least one distance or depth or proximity sensor, at least one processing unit and communications means. Such a recognition system, being primarily aimed at the detection and recognition of prices and products, comprises or is based on deep-learning detection and recognition embodiments or algorithms, for the detection and recognition of relevant information present in different areas of the store shelves. The detection and recognition algorithms are trained with examples of typical scenarios of the store, comprising specific architectures optimized for the detection and recognition of relevant information present in the different areas of the shelves, where such relevant information comprises letters, numbers and characters commonly used in stores and products. The detection and recognition algorithms for price tags, price labels and product texts have high levels of accuracy, as well as efficiency in processing hundreds of thousands of images captured when covering an entire large store. According to an embodiment, the detection and recognition algorithms are executed in a remote server, once the captured images are communicated to that server through the communications means. According to another embodiment, the detection and recognition algorithms are executed in the mobile robot, by means of the processing unit or units. In accordance with another embodiment, detection and recognition algorithms are executed partially in the mobile robot, by means of the processing unit or units, and partially in a remote server; for example, the detection of the relevant information is carried out in the processing units of the mobile robot and once this relevant information is detected, it is communicated to the remote server for the recognition of the information in this server. This last embodiment allows sending only the relevant parts of the captured images to the server, which reads the texts and labels, avoiding overcharging the communications means and/or the robot's processing units, and avoiding sending and/or processing a large amount of high-resolution images through the means arranged in the robot.

As an example, the detection and recognition algorithm has an accuracy of at least 95% and an accuracy of at least 99% in label detection, an accuracy of at least 97% in detecting the product code inside the price label, an accuracy of at least 96% in reading prices, an accuracy of at least 95% in detecting product labels and an accuracy of at least 90% in detecting the arrangement of the products on the shelf.

In accordance with an embodiment, the robotic system of the invention comprises a training system of the detection and recognition algorithms, where said training system may be manual, by means of a set of real images of usual store shelf scenarios, or automatic, by means of a simulator of the usual store shelf scenarios, said simulator being formed by a set of synthetic images simulating the passage of the robot through the store aisles, and said synthetic images being of photographic quality, being practically indistinguishable compared with the real images captured by the robot.

In the case of the manual training system, the images of price tags and product codes are manually obtained by operators, directly from databases or from the shelves of a store. In the case of the automatic training system, the simulator allows the generation of synthetic images of shelves with products, simulating the passage of the robot through the store aisles as indicated above.

In short, the scenario simulator allows a virtual robot to circulate on a virtual shelf where the products and texts being shown are known. With this information it is possible to train the deep learning algorithms, which require a supervised training, that is to say, they need training examples with known labels, and in addition, they only achieve high degrees of performance if they are trained with massive sets of data, of millions of examples for a task like the indicated above. Thus, by generating virtual scenarios of photo-realistic quality, the robot is able to automatically access millions of text images present in retail stores, each image with its corresponding label indicating the corresponding text. This mass of examples allows improving the reading of price logos and texts in general, reaching levels of precision similar to a human operator. This allows for a robot to be capable of reading the information available in the store, whether price signs, product labels, posters with offers, aisle information signs, etc. This is a key capacity and differentiates this invention from alternative systems, which also allows a comprehensive solution to the various aspects of monitoring shelves, and facilitating the success of the robotic system proposed as a commercial solution.

Additionally, the image sensor associated with the recognition system is arranged to capture images of the different areas of the store shelves and the distance or depth or proximity sensor is arranged to determine the distance between the robot and a main plane of the shelf and/or a main plane of each source of relevant information present on the shelves. In this context, such relevant information is contained in the captured images, which are stored in the robot's storage means(s).

According to an embodiment, the different areas of the shelves are captured in several consecutive images, where the relevant information appears in three of the captured images as average. In addition, the consecutive images are blended by calculating a homograph between successive images and the fusion of the point clouds provided by the distance or depth sensor. Using this information, a panoramic view of each shelf is constructed with the information of appearance and depth or distance, where this panoramic view corresponds to the planogram of the products on each shelf of the store. Then, the panoramic view or planogram is analyzed by detection and recognition algorithms to extract relevant information regarding the layout and spatial extent of each product on the shelf.

Finally, the robotic system of the invention comprises a multi-target planning system in communication with at least one processing unit and with the navigation system. Such a multi-target planning system comprises a dynamic route planning routine that evaluates the coverage of all areas of the store shelves to be monitored, ensuring full coverage of the store. In addition, the multi-target planning system communicates with the navigation system to guide the robot according to the dynamic route planning, in real time. The purpose of the multi-target planning system is to balance various operational requirements. At its most basic level of operation, the planning system guarantees coverage of all areas of the store that need shelf monitoring, including following efficient routes and also being prepared to perform re-planning in case of encountering problems, such as areas not accessible for maintenance or product replacement. Additionally, the planning system considers the requirement of the robot recognition system, which requires acquiring adequate images of the shelves to correctly identify price and product signs. In this respect, the multi-target planning system could determine to take an image again for example if it was blurred due to a sudden movement of the robot, marking the position of the image that must be recaptured to return to that position before finishing the capture of images.

Considering the above, the multi-target planning system of the autonomous robotic system of the invention comprises a subsystem of quality and coverage certification of the images captured, which evaluates the quality of the captured images according to the requirements of the recognition system for the detection and recognition of the relevant information, and which evaluates the total coverage of the different areas of the store shelves in the path of the robot, determining whether an image should be captured again and re-planning the route if necessary. In this way, the multi-target planning system communicates with the navigation system to activate the movement and direction means as required.

In accordance with a preferential embodiment of the invention, the navigation system comprises a shelf-tracking subsystem or behavior, where said shelf-tracking subsystem determines the main plane of the store shelf by integrating the information from at least one distance or depth or proximity sensor and from at least one image sensor, guiding the robot in parallel to the main plane of the shelf. The shelf tracking subsystem uses the depth information to estimate the main plane of the shelf. Thus, by determining the normal direction to the main plane of the shelf and the distance of the robot therefrom, a differential control system allows to drive the robot's movement and direction means by adjusting the rotation and distance of the robot from the main plane of the shelf.

In this respect, the robotic system of the invention uses the depth information to estimate the position of the plane constituting the main plane of the shelf, and then plans the robot's movement so that it maintains navigation parallel to said plane and facilitates the operation of the sensors capturing information from the shelf. This behavior is called "shelf tracking". The robot follows this behavior until some event interrupts it, for example, the presence of an obstacle to be avoided such as the presence of a cart or a person. Faced with this scenario the robot first waits a certain time to verify if the obstacle moves and allows it to continue with the shelf following; if not, the robot changes from the "shelf-tracking" behavior to the behavior called "obstacle avoidance". After the obstacle is avoided, the robot returns to the "shelf-tracking" behavior and, in addition, marks the zone it could not capture from the shelf to return later to capture the pending data.

In accordance with a preferred embodiment, the autonomous robotic system of the invention comprises at least one image sensor and at least one distance or depth or proximity sensor, arranged on one or both of the side faces of the robot, capturing images of the different areas of the shelves in the direction of the right and/or left sides of the robot. In this context, one embodiment of the lateral distribution of the sensors comprises two capture sensors, each capture sensor being formed by the union of an image sensor with a distance or depth or proximity sensor, where such capture sensors are arranged in the upper structure of the robot separated at different heights within the upper structure, capturing images of the whole height of the shelves. This configuration of sensors at different heights within the body of the robot allows ensuring that the captured images cover the entire shelf; in addition, it allows capturing information from hanging signs such as aisle posters. As an example, the capture sensors can be placed towards the lower end of the robot body, over the mobile base, for example at 1 meter height, and towards the upper end of the robot body, for example at 2 meters height.

According to one embodiment of the invention, each capture sensor is formed of image sensors of the RGB (Red Green Blue) type with high resolution to distinguish small texts and RGB-D (Red Green Blue-Depth) sensors to capture depth information.

Furthermore, the autonomous robotic system of the invention may include a remote charging station for charging the power supply or batteries of the robot. Such a remote charging station is arranged in a specific position in the store, preferably in a service area, for charging the power source or batteries of the robot's drive system, supplying power wirelessly or by cables to such power source. Preferably when detecting low battery levels or when finishing the image capture, the robot goes to the remote charging station autonomously and activates a battery recharging behavior that allows it to adjust its movements in order to connect autonomously to a battery recharging base located in that remote charging station. For this purpose, the robot includes a docking or coupling system that enables it to connect autonomously to the remote charging station's base.

Furthermore, according to another embodiment of the invention the autonomous robotic system comprises a graphic interface for interaction with a user, said graphic interface being integrated in the body of the robot or being connectable with the same through the communications means.

BRIEF DESCRIPTION OF THE FIGURES

As part of the present application, the following representative figures of the invention are presented, showing preferred embodiments thereof and, therefore, they should not be considered as limiting the definition of the matter claimed by the present application.

DESCRIPTION OF THE PREFERRED EMBODIMENT

Figure 1:
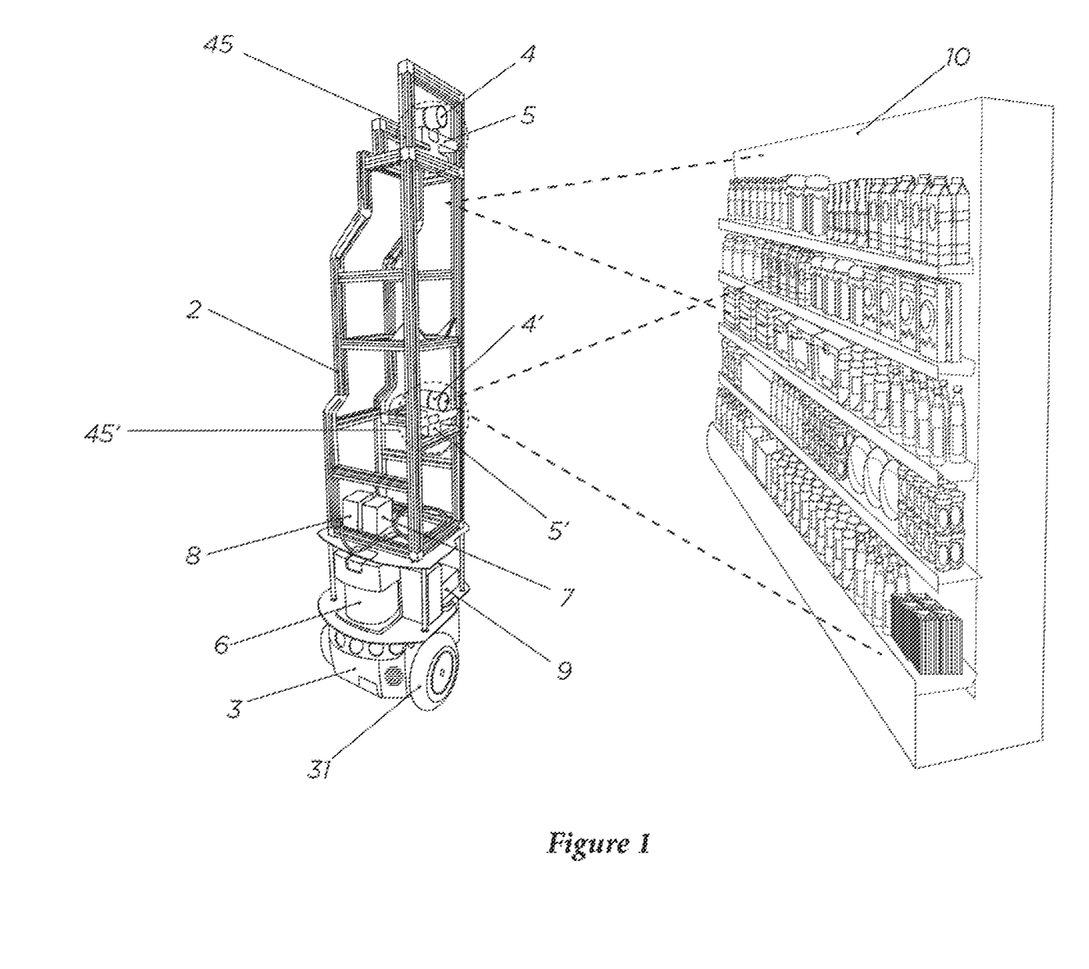
FIG. 1 shows a representative diagram of the body of the robot, identifying the components involved in the capture of information.

FIG. 1 shows a representative sketch of the robot's body (1) according to one embodiment of the invention. In the embodiment of FIG. 1, two capture sensors (45, 45') are arranged at different heights inside the robot's body (1), fixed to the upper structure (2) of the robot's body towards one of its lateral faces, where each capture sensor is formed by the union of an image sensor (4, 4') with a distance or depth or proximity sensor (5, 5'). As shown in FIG. 1, the two capture sensors (45, 45') shown are arranged at different heights inside the robot's body (1), specifically in the upper structure (2) of the robot, allowing to cover the entire height of the shelf to be monitored and thus capture all the necessary information from said shelf. In fact, FIG. 1 shows the robot's field of vision or capture on a shelf (10) schematically. According to alternative embodiments, there may be one capture sensor or more than two capture sensors located at different heights and on one or both side faces, the main purpose being to allow the capture of all or as much information of interest as possible from the shelves while the robot navigates the store aisles.

In the embodiment of FIG. 1 it can be also seen that the upper structure (2) is joined at its bottom to the mobile base (3) of the robot, which comprises the robot's drive system (not shown) connected to movement and direction means (31). In this case, the movement and direction means (31) are a set of wheels driven by the robot's drive system. In a preferred embodiment, the drive system comprises one or more electric motors arranged on the mobile base (3), connected to one or more energy sources (not shown) arranged on the mobile base (3) or on the upper structure (2), to power the drive system and drive the movement and direction means (31).

FIG. 1 also shows the arrangement of at least one laser sensor (6) arranged towards the front face of the robot, in this case located on the moving base (3) of the robot, where this laser sensor (6) is arranged to measure distances to the robot's surroundings, for example, distance to obstacles.

FIG. 1 also shows the schematization of at least one processing unit (7), comprising at least one storage means and at least one processor, arranged to store and process the information captured by the robot, respectively. In accordance with an embodiment of the invention, a processing unit (7) is arranged for each capture sensor (45, 45') arranged in the robot's body (1), which allows separate processing capacities for the information captured from the shelf, and thus to arrange processing units of less consumption and smaller size within the body (1).

FIG. 1 also shows the schematization of communications means (8) arranged in the body (1) of the robot, these communications means (8) comprising a wireless communications link, for communicating information to at least one server located in a remote position (not shown), and/or a wired communications link, for communicating information to at least one server connected by cable to the robot (not shown).

Finally, FIG. 1 also shows the diagram of a docking or coupling system (9) of the robot for autonomous connection of the robot to a remote charging station (not shown). When low battery levels are detected or when the image capture is finished, the robot goes autonomously to the remote charging station and activates a battery recharging behavior that enables it to adjust its movements to connect autonomously to the battery-recharging base located in that remote charging station, supplying power wirelessly or by cables to the robot's power source.

In other embodiments not illustrated in FIG. 1, the robot has at least one image sensor that may be associated to at least one distance or depth or proximity sensor, arranged towards the front face of the robot to assist in the detection of obstacles that may be in the robot's path, allowing the robot to take evasive actions to avoid the obstacle and continue monitoring.

In addition, although FIG. 1 shows a specific arrangement of the components inside the body (1) of the robot, any variation in the arrangement of the robot components is considered within the scope of this application, considering that such arrangement seeks to maximize the operability of the components in relation to their functions. On the other hand, it is preferable that the arrangement of the components inside the body of the robot considers their weight and the distribution of the robot's center of mass, seeking to keep the center of mass as low as possible to avoid affecting the stability of the robot during its movement.

Figure 2:
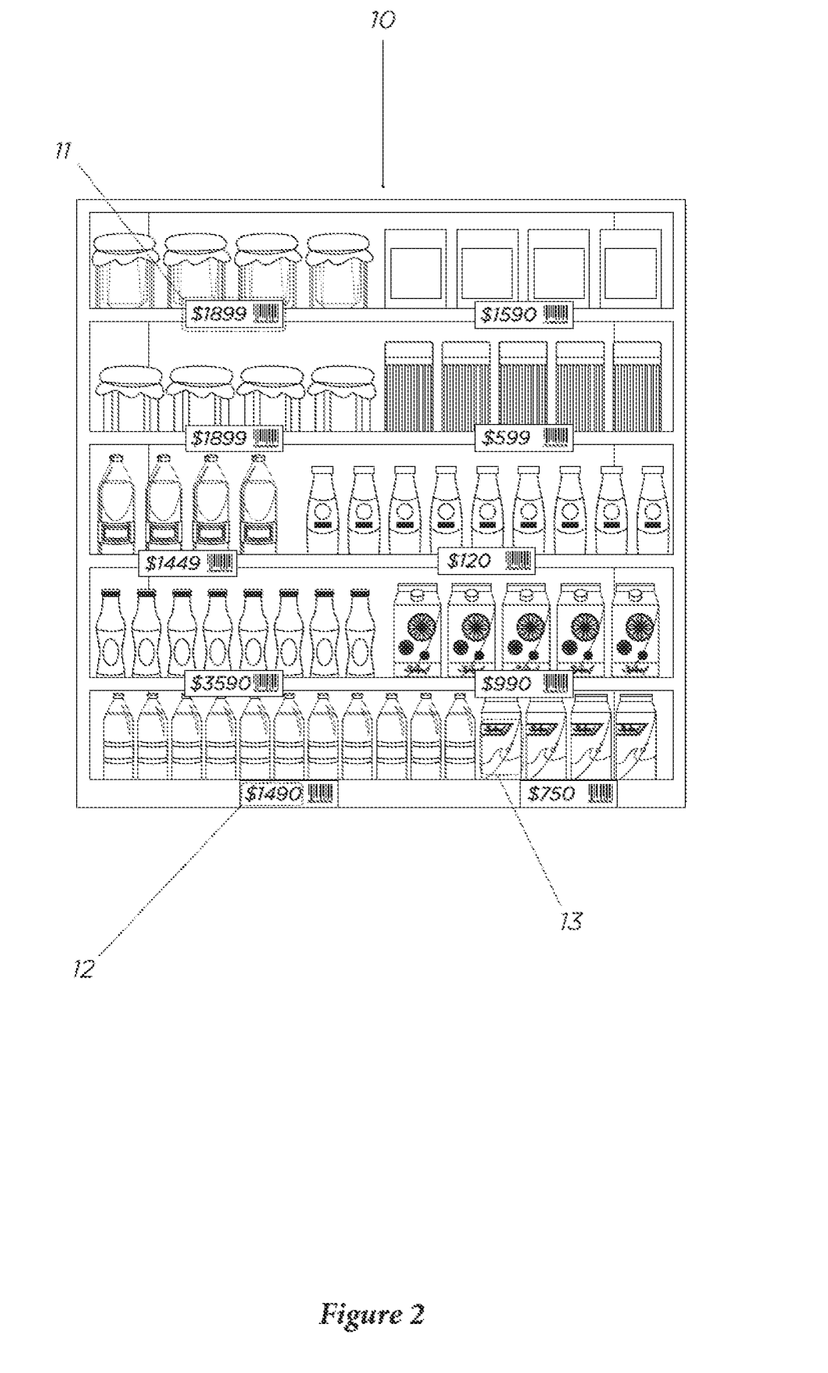
FIG. 2 shows an example of the detection of labels or price tags on a shelf, together with the detection of the price on such labels.

FIG. 2 shows an example of the detection of information arranged in a shelf (10) by the robot recognition system, this information detected being enclosed in boxes (11, 12, 13). This particular example shows the detection of price labels or tags (11) on the shelves (10), containing the product information that should be arranged on the shelf, including product price and product code, among others. In addition, FIG. 2 shows the detection of the product price (12) within the detected label or sign (11) and the detection of texts on the products' packaging (13), showing that the robot is capable of capturing multiple information by means of the image sensors arranged for such purposes.

In this context, according to an embodiment of the invention, the detection and subsequent recognition of the information is performed on images captured and stored. However, in another embodiment the robot performs the detection and/or recognition in real time, i.e., detecting the rectangular areas (11, 12, 13) where relevant text appears. In the example of FIG. 2 said text is the text of the labels or strips with information about each product (11), the price inside the label (12) and texts in each product (13). This real-time detection embodiment allows processing and storing only the detected portions of the images, recognizing the texts and prices only on the relevant portions of the images. This allows not to overcharging the communications means and the processing unit(s), avoiding the processing and/or sending of a large amount of high resolution images.

Figure 3:
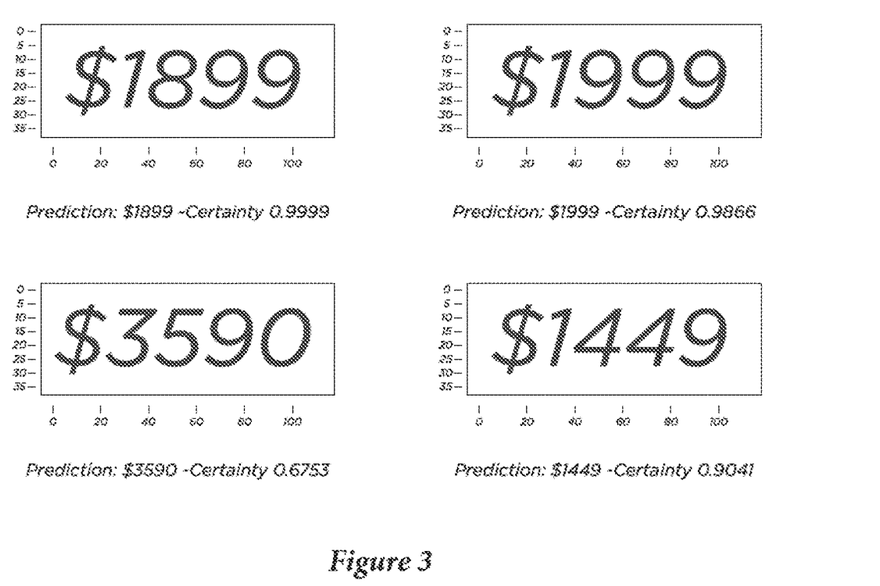
FIG. 3 shows an example of price recognition on labels or tags in a shelf.

FIG. 3 shows an example of price recognition on labels or tags of a shelf, identifying the prediction after price recognition by the recognition system and a certainty factor of that prediction. In this respect, the robot's recognition system, in particular the detection and recognition algorithms included in that system, are configured to process the images captured by the capture sensor(s), to detect the relevant portions of those images, and to predict the number and text information contained in those images. In this case, correct predictions are shown with different degrees of certainty, as a result of the scenario from which the prediction was made (blurred image, tilted label, camera not perpendicular to the label, shadows, etc.).

Figure 4:
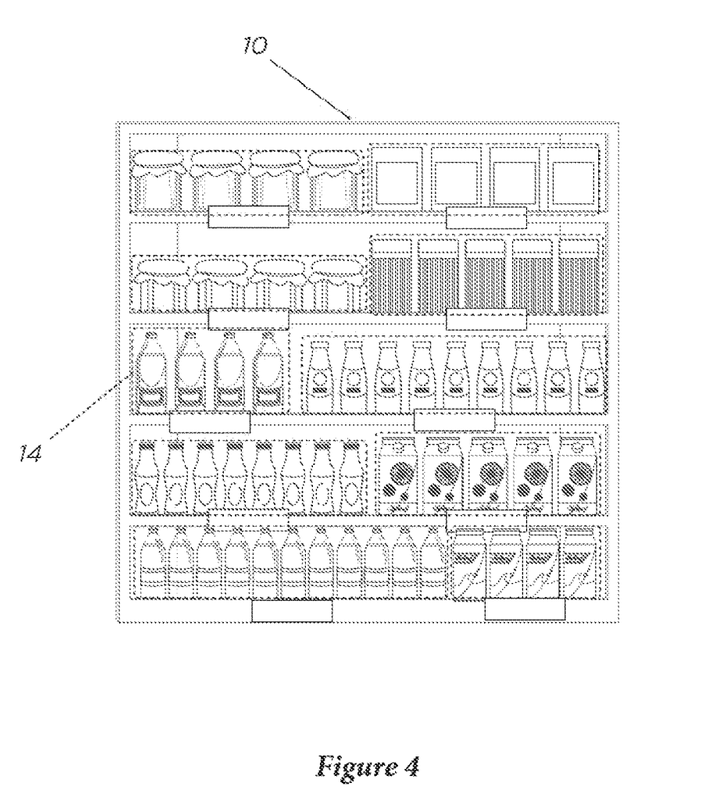
FIG. 4 shows an example of product map detection on a shelf.

FIG. 4 shows a graphic representation of a shelf image (10) with the identification of the product planogram (14) on the shelf, i.e. the identification of how different products on the shelf are organized (10). From FIG. 4, it is possible to show that the robot is able to distinguish between different products, for example by identifying types of labels and/or by identifying the external appearance of each product, achieving great precision in the determination of the planogram (14). This information allows, among other things, to determine if the space and location assigned to a certain product on a shelf is correctly occupied or not, activating the corresponding alarms.

Figure 5:
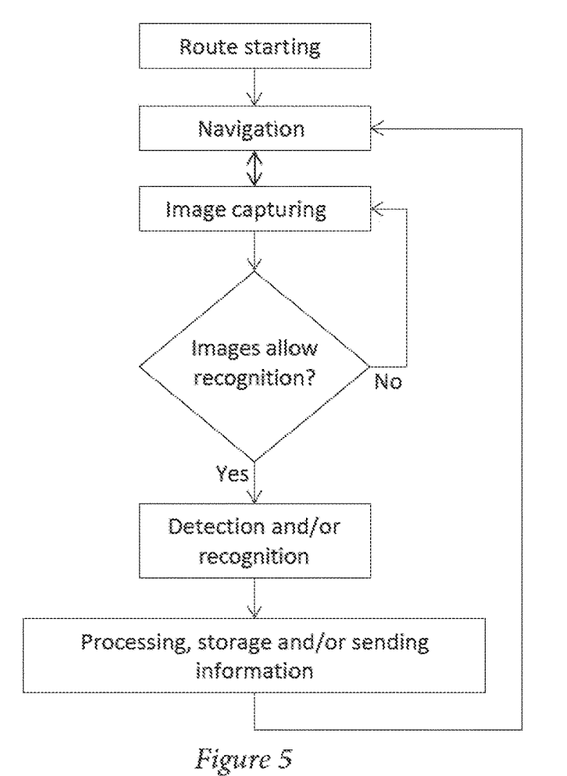
FIG. 5 shows an outline of the procedure for monitoring the condition of shelves according to one embodiment of the invention.

FIG. 5 shows a representative scheme of the monitoring procedure of the state of the shelf executed by the robot of the invention, covering the main stages of such procedure. In said scheme, exemplifying the main stages of the monitoring procedure is sought, without limiting the operation of the robotic system of the invention, particularly, in relation to the order of stages shown. It is in fact important to emphasize that the monitoring procedure executed by the robotic system of the invention comprises stages that can be performed simultaneously and/or sequentially, in the order shown or in a different order.

In this context, the stages represented in FIG. 5 are described below, identifying the different alternatives contemplated by the invention.

Beginning of the Travel

At this stage illustrated in FIG. 5 as the initial stage of the procedure, the robotic system of the invention begins its travel through the aisles of the store. For the robot to start the travel in the store there are multiple alternatives, among them:

a travel plan has been entered for the robot by an operator, either directly to the robot or remotely through a server and the robot's communications means;

a start time has been scheduled for the robot to travel freely through the store, with a specific pre-established target, for example, to cover all or part of the store's aisles;

there is a daily work cycle that the robot must comply with;

the robot has stopped leaving the previous path incomplete, or it is necessary to complete/complement missing information from the previous travel;

the robot has stopped for a short period to recharge the power supply or batteries or for some other reason and will resume the travel; and/or replanning the route as a result of the need to recapture images or cover areas not covered in the previous travel.

As indicated above, there are multiple path start options, but the object of this invention is not to define all the possible scenarios that give rise to the path start of the robotic system of the invention.

In addition, this travel starting stage comprises the state of the robot before starting the travel, which is usually at rest waiting for the assigned daily operation cycle. During this resting time, the robotic system can perform different operations, such as software updating, recharging the power supply or batteries, planning work routines and navigation routes, etc.

Autonomous Navigation

In this stage, illustrated in FIG. 5 as the second stage of the procedure, the autonomous navigation of the invention's robotic system through the aisles of the store is represented.

In general terms, the robot travels the planned route capturing images of the product shelves which monitoring or supervision is required. The robot's navigation is configured to allow the desired coverage of the store using autonomous navigation and multi-target planning systems to direct the robot in real time, incorporating obstacle avoidance and real-time route replanning.

Figure 6:
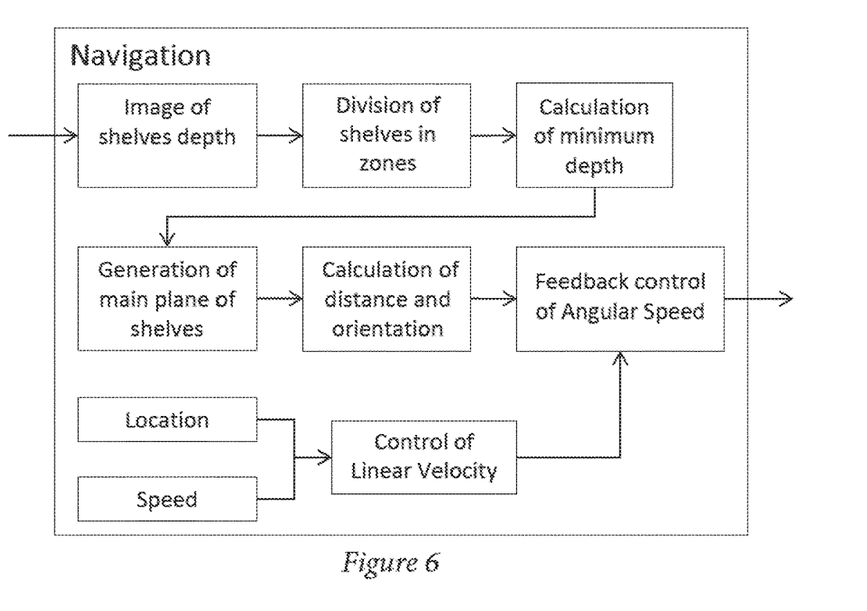
FIG. 6 shows an outline of the navigation procedure for the monitoring of shelves in accordance with an embodiment of the invention.

Additionally, the robot's navigation stage includes the inspiration of specific navigation solutions, such as a sub-system or shelf-tracking behavior, as exemplified in FIG. 6.

Image Capture

This stage, illustrated in FIG. 5 as the third stage of the procedure, represents the capture of images by the robot of the invention while it navigates in the store.

The main object of the image capture is to obtain relevant information from the shelves of products that require supervision or monitoring. For this purpose, the capture sensor(s) of the robot and the processing unit(s) are used.

According to FIG. 5, there is a two-way relationship between the capture of images and the robot navigation. Such bidirectional relationship seeks to show that, according to an embodiment, the navigation uses image processing to direct the robot during the path, for example, for obstacle detection, route replanning by blurred images or incomplete information and/or detection of the main plane of the shelf for the shelf-tracking behavior exemplified in FIG. 6, among others.

Additionally, FIG. 5 shows that, once the images are captured, the robotic system of the invention can verify whether the images meet the criteria for detection and recognition of relevant information and/or whether images for such detection and recognition are missing. This step is illustrated by a decision box showing the robot's ability to recapture images if required.

In this context, although FIG. 5 shows the decision on image recapture after the capture of the images, according to the embodiments of the invention the verification and decision on image recapture can be made immediately after the capture of images, once the captured images are processed, and/or upon request by an operator.

Detection and/or Recognition

This stage, illustrated in FIG. 5 as the fourth stage of the procedure, encompasses everything related to detection and recognition of relevant information from the images captured. In this regard, it has already been indicated in this application that there are multiple variants to the process of detection and recognition of relevant information, where, for example, according to one embodiment, the detection and recognition algorithms are executed in a remote server, once the captured images are communicated to that server through the communications means; according to another embodiment, the detection and recognition algorithms are executed in the mobile robot, through the processing unit or units; in accordance with another embodiment, detection and recognition algorithms are partially executed in the mobile robot, by means of the processing unit or units, and partially in a remote server, for example, the detection of the relevant information is carried out in the processing units of the mobile robot and, once this relevant information is detected, it is communicated to the remote server for the recognition of the information in this server.

In this context, the preferred embodiment for the detection and recognition of relevant information is that in which the detection of relevant information is carried out by the mobile robot, that is, using the processing unit or units arranged in that robot. To this end, the relevant information (strips/labels, prices, product labels and any text/numbers/information of interest) is detected from the captured images, based on deep-learning detection and recognition algorithms included in the recognition system of the invention, which allows operation in real time. The relevant information detected is then sent via the robot's communications means to a remote server for processing, for example, by sorting the information by aisle. This embodiment avoids overcharging the communications means, avoiding the sending of high-resolution images since only those portions of the images containing the relevant information are communicated for processing.

On the other hand, according to an alternative of the previous embodiment, the relevant information detected by the robot is sent to the remote server only once the mobile robot has finished its travel, being stored in the robot's storage means while it travels through the store.

Finally, regarding the recognition of relevant information, it is important to note that this recognition, whether performed in the same robot or in a remote server, includes the prediction (reading) of the texts/numbers/information contained in the relevant information detected by the robotic system. According to an embodiment, the recognition is performed at three levels, namely, price recognition, product code recognition (SAP) and product label recognition (information on the product packaging). The recognition is performed by deep-learning recognition algorithms included in the recognition system of the robotic system of the invention, such algorithms being especially designed for each of the recognition tasks. The training of these algorithms is carried out mainly using the scenario simulator that contemplates an alternative of the invention, where said simulator is capable of providing a large amount of synthetic images, within the range of millions of images, representing different scenarios of the store shelves. According to an embodiment, the parameters of the recognition algorithms are subsequently refined using real images, within the range of thousands, captured directly in the store.

Processing, Storage and/or Sending of Information

This stage, illustrated in FIG. 5 as the last stage of the procedure, includes all the remaining stages that can provide useful information to the robot's end user.

As it has been already clarified along the application, the illustration of this stage as well as the others in the order indicated does not necessarily represent the order of execution of the stages, which are mostly executed simultaneously and/or by different sequential alternatives. In particular, the processing, storage and/or sending of the information is executed in different alternatives, since such actions participate in the whole monitoring procedure carried out by the robotic system of the invention.

For example, the recognition of the relevant information in the stage identified as detection and/or recognition comprises the subsequent processing of the recognized information to filter, consolidate and send the information. In this example, the recognized information is filtered in three stages, discarding the low confidence recognized information, correcting the recognized information based on redundant information (information contained in more than one image), and consolidating the recognized information from more than one image captured into a single result.

Then, according to an embodiment, the information consolidated with the recognition of the relevant information is integrated with the estimation of the planogram of the products on the shelf, which is built in the robot or in the remote server by means of the information coming from the capture sensors (images and depth). With this integrated information the robotic system of the invention, either by means of the processing units of the robot or in the server, is capable of determining the stock of products on shelves, as well as the state and area of exposure of the products, performing the monitoring of the state of the shelves being the object of the invention.

Furthermore, the invention contemplates the process of comparison of the recognized information with the final user's databases, allowing to verifying the operational state of the shelves in relation to the differences of prices labeled with the listed prices, the spatial distribution of the products according to the assignment to each supplier (planogram), etc. With this, the robotic system of the invention, either by means of the processing unit or units in the robot or by means of the server, generates reports and/or alarms to it or to the final users about the difference between prices, product replacement and/or product availability that allow the final user or users to take the necessary actions against a given state, for example, correcting product labels and/or replacing stock. Among the main end users of the invention, we have the users associated with the store where the robot's path is taken and the users associated with the suppliers of the monitored products.

Finally, as previously mentioned, FIG. 6 shows a representative scheme of a shelf tracking subsystem or behavior comprised of the invention's autonomous navigation system. Where said shelf-tracking subsystem is configured to determine the main plane of the store shelf by integrating the information from at least one distance or depth or proximity sensor and from at least one image sensor, guiding the robot parallel to the main plane of the shelf. The shelf tracking subsystem exemplified in FIG. 6 uses the depth information to estimate the main plane of the shelf and control the navigation according to the following.

The shelf depth information in the captured images is processed, this depth information being used to divide the shelf into different zones, from which minimum depth estimation is made in selected zones. The closest zones define the main plane of the shelf. Then, the minimum depth data are consolidated and, thus, the main plane of the shelf is generated, thus making it possible to calculate both a distance between the robot and the main plane of the shelf and the robot orientation with respect to such main plane. This information is used by means of angular velocity feedback control, integrated in the navigation system enabling to activate the movement and direction means to direct the robot as required, in this case, tracking parallel to the main plane of the shelves.

Additionally, information about the location of the robot in the store, automatically obtained by the robot from the robot location system from techniques known as SLAM and/or by identifying the aisles of the store by image processing, along with information associated with the speed of the robot during image capture and its movement, usually defined as a parameter, the robot's navigation system is capable of controlling its linear speed and synchronizing this speed with the image capture, which information is also used by the angular speed feedback control to drive the movement and direction means appropriately, in this case, by tracking parallel to the main plane of the shelf and ensuring adequate distance and orientation to improve image capture.

The invention claimed is:

1. An autonomous robotic system for automatically monitoring the state of shelves in stores, the system comprising:
   a mobile robot having a robot body, the robot body comprising:
      a mobile base comprising a drive system connected to a movement and direction means;
      an upper structure arranged to accommodate sensors, at least one processing unit and a communications means, the sensors comprising:
         at least one laser sensor;
         at least one distance or depth or proximity sensor; and
         at least one image sensor;
      wherein at least one processing unit comprises at least one storage means and at least one processor;
   a navigation system communicating with the at least one laser sensor, at least one image sensor, at least one distance or proximity sensor and at least one processor, wherein:
      the laser sensor is configured to measure the robot's environment by capturing information of the store planimetry, wherein said information on the planimetry is processed by the navigation system which constructs a map of the store's spatial configuration and operates the movement and direction means by guiding the robot to navigate the store aisles; and
      the image sensor and the proximity sensor are configured to display and measure the robot's environment, and capture display and distance information, wherein the display and distance information is processed by the navigation system which generates dynamic navigation routes that adapt to obstacles present in the robot's environment;
   a recognition system communicating with the at least one image sensor, at least one distance or proximity sensor, at least one processing unit and the communications means, wherein:
      the recognition system comprises deep-learning detection and recognition algorithms, the deep-learning detection and recognition algorithms are configured to detect and recognize relevant information present in different areas of the store shelves
      the image sensor is configured to capture images of the different areas of the store's shelves, and
      the distance or proximity sensor is configured to determine the distance between the robot and a main plane of the shelf and/or a main plane of each relevant piece of information present on the shelves,
      wherein the relevant information is contained in the captured images and stored in the storage means; and
      the detection and recognition algorithms are trained with examples of typical store scenarios comprising specific architectures optimized for the detection and recognition of relevant information present in the different areas of the shelves, the relevant information comprising: letters, numbers and characters commonly used in stores and products; and
   a multi-target planning system in communication with at least one processing unit and with the navigation system, wherein:
      the multi-target planning system comprises a dynamic route planning routine that evaluates coverage of all areas of the store's shelves to be monitored, thereby ensuring full coverage of the store; and
      the multi-target planning system communicates with the navigation system to guide the robot according to the dynamic route planning in real time.

2. The autonomous robotic system according to claim 1, wherein the navigation system comprises a shelf-tracking subsystem, the shelf-tracking subsystem being configured to determine the main plane of the store shelf by integrating information from the at least one sensor selected from distance, depth or proximity sensors and from the at least one image sensor and guide the robot in parallel to the main plane of the shelf, wherein the shelf-tracking subsystem uses the Hough transform together with the information from the image and distance or proximity sensors to determine the normal direction to the main plane of the shelf and the distance from the robot, using a differential control system that drives the robot's movement and direction means by adjusting the rotation and distance of the robot from the main plane of the shelf, and wherein the map built by the navigation system is bidimensional or tridimensional.

3. The autonomous robotic system according to claim 1, wherein the multi-target planning system comprises a subsystem that evaluates the quality and coverage certification of the captured images, the subsystem evaluating the quality of the captured images based on the requirements of the recognition system wherein the subsystem further evaluates the total coverage of the different areas of the store shelves in a path of the robot to determine whether an image should be captured again and wherein the subsystem replans the route if necessary.

4. The autonomous robotic system according to claim 1, further comprising a training system configured to train the detection and recognition algorithms, wherein said training system may be manual, based on a set of real images of usual store shelf scenarios, or automatic, based on simulation of the usual store shelf scenarios, the simulation being formed by a set of synthetic images simulating the passage of the robot through the store aisles, and the synthetic images being of photographic quality.

5. The autonomous robotic system according to claim 1, wherein the at least one image sensor and the at least one distance or proximity sensor are arranged on the front face of the robot to detect obstacles in the aisles in the direction of the robot's movement, and wherein the at least one image sensor and the at least one distance or proximity sensor are arranged on one or both of the side faces of the robot, to capture images of the different areas of the shelves in the direction of the right and/or left sides of the robot wherein the robotic system further comprises at least two capture sensors, each capture sensor being formed by the union of an image sensor with a distance or proximity sensor, wherein the capture sensors are arranged in the upper structure of the robot and are separated at different heights within the upper structure, capturing images of the whole height of the shelves, wherein each capture sensor is formed by image sensors of the RGB-D.

6. The autonomous robotic system according to claim 1, further comprising a charging station for the robot, wherein batteries in the robot's drive system are supplied with energy wireless or by cable.

7. The autonomous robotic system according to claim 1, wherein the communications means comprise at least one of:

a wireless communication link configured to communicate information to at least one server located remotely, a wired communication link configured to communicate information to at least one server wired to the robot, wherein the communications means generate alarms and/or daily reports regarding: at least one of:

the stock of a product, incorrect or missing relevant information regarding price tags and offers on the shelves, and incorrect position of a product on a shelf, and/or layout conformation and spatial extension used by each product on the shelf.

8. The autonomous robotic system according to claim 1, further comprising a graphic interface for interaction with a user, the graphic interface being integrated in the body of the robot or being connectable with the robot through the communications means.

9. The autonomous robotic system according to claim 1, wherein the movement and direction means comprise one or more gyroscopes and one or more accelerometers.

10. The autonomous robotic system according to claim 1, wherein the different areas of shelves are captured in several consecutive images, wherein each piece of relevant information appear in three of the images captures as average, wherein the consecutive images are blended by the recognition system that builds a panoramic view of each shelf, the panoramic view being constructed with appearance or view information and depth or distance information, wherein said panoramic view is reviewed by the detection and recognition algorithms for extracting relevant information, and wherein the panoramic view corresponds to the planogram of the products in each shelf of the store.

11. The autonomous robotic system according to claim 1, wherein the detection and recognition algorithms are executed according to any of the following alternatives:

in a remote server, once the captured images are communicated to the remote server through the communications means;

in the at least one processing unit of the robot, by detecting and recognizing the relevant information fully by processing in the robot and sending-processed information to a final user; or partially in the robot as regards the detection of relevant information, and partially in a remote server as regards the recognition of the relevant information, wherein the detected relevant information is sent to the remote sever by the robot's communications means for processing in said remote server, which then sends the processed information to the robot and/or final user.

12. The autonomous robotic system according to claim 1, wherein the navigation system determines the position of the robot in the store by the recognition of the captured images and an association of the captured images with the store.

13. The autonomous robotic system according to claim 1, wherein the detected relevant information, recognized by the recognition system, corresponds to stock of products, product labels and tags, including logos and information printed on product packagings, price labels and tags, including product codes, identifiers and values, temporary or permanent signs placed on the shelves, aisle signs and distribution of products on shelves.

14. The autonomous robotic system according to claim 1, wherein the mobile base comprises a set of stability sensors configured to control the robot's movement and keep its stability.

15. A method for automatically monitoring the state of shelves in stores through a robotic system that includes, a mobile robot having a robot body, the robot body comprising:

a mobile base comprising a drive system connected to a movement and direction means;

an upper structure arranged to accommodate sensors, at least one processing unit and a communications means, the sensors comprising:
   at least one laser sensor;
   at least one distance or depth or proximity sensor; and
   at least one image sensor;
wherein at least one processing unit comprises at least one storage means and at least one processor;
a navigation system communicating with the at least one laser sensor, at least one image sensor, at least one distance or proximity sensor and at least one processor, wherein:
the laser sensor is configured to measure the robot's environment by capturing information of the store planimetry, wherein said information on the planimetry is processed by the navigation system which constructs a map of the store's spatial configuration and operates the movement and direction means by guiding the robot to navigate the store aisles; and
the image sensor and the proximity sensor are configured to display and measure the robot's environment, and capture display and distance information, wherein the display and distance information is processed by the navigation system which generates dynamic navigation routes that adapt to obstacles present in the robot's environment;
a recognition system communicating with the at least one image sensor, at least one distance or proximity sensor, at least one processing unit and the communications means, wherein:
the recognition system comprises deep-learning detection and recognition algorithms, the deep-learning detection and recognition algorithms are configured to detect and recognize relevant information present in different areas of the store shelves
the image sensor is-configured to capture images of the different areas of the store's shelves, and
the distance or proximity sensor is configured to determine the distance between the robot and a main plane of the shelf and/or a main plane of each relevant piece of information present on the shelves,
wherein the relevant information is contained in the captured images and stored in the storage means; and
the detection and recognition algorithms are trained with examples of typical store scenarios comprising specific architectures optimized for the detection and recognition of relevant information present in the different areas of the shelves, the relevant information comprising: letters, numbers and characters commonly used in stores and products; and
a multi-target planning system in communication with at least one processing unit and with the navigation system, wherein:
the multi-target planning system comprises a dynamic route planning routine that evaluates coverage of all areas of the store's shelves to be monitored, thereby ensuring full coverage of the store; and
the multi-target planning system communicates with the navigation system to guide the robot according to the dynamic route planning in real time
wherein the method comprises:
   starting a travel of a mobile robot in a store for monitoring the state of the shelves;
   autonomously navigating by the mobile robot the aisles of the store, said navigation being configured to ensure a desired coverage of the store using the multi-target planning and navigation systems wherein the multi-target planning and navigation systems incorporate obstacle-avoiding capability and route replanning;
   capturing images, by the robot, while navigating the store, to get relevant information on the product shelves requiring supervision or monitoring by using the robot's capture sensor(s) and processing unit(s);
   detecting and recognizing the relevant information contained in the captured images using deep-learning detection and recognition algorithms;
   processing the detected and recognized relevant information and communicating the processed information through the robot's communications means to an end user using generated reports and/or alarms.

16. The method according to claim 15, wherein the step of starting a travel further comprises at least one of the following alternatives:
   the mobile robot follows a travel plan that has been entered by an operator, either directly to the robot or remotely through a server;
   the mobile robot has been scheduled a start time to travel freely through the store, with a specific pre-established target, the robot covering all or part of the store's aisles;
   the mobile robot includes a daily work cycle that must be complied with;
   the mobile robot has stopped leaving the previous path incomplete, or it is necessary to complete/missing information from a previous travel;
   the mobile robot has stopped for a short period to recharge the power supply or batteries or for some other reason and will resume the travel;
   the route has been replanned as a result of the need to recapture images or cover areas not covered in the previous travel; and
   wherein the method further comprises considering the state of the mobile robot before starting the travel, wherein the state of the mobile robot before starting the travel includes being at rest waiting for the assigned daily operation cycle,
   wherein while the mobile robot is at rest the robotic system can perform different operations, such as software updating, recharging the power supply or batteries, planning work routines and navigation routes.

17. The method according to claim 15, wherein the step of autonomous navigation comprises a shelf tracking subsystem configured to determine the main plane of the store shelves by integrating information from at least one distance or proximity sensor and from at least one image sensor guiding the robot parallel to the main plane of the shelves.

18. The method according to claim 15, further comprising verifying whether the captured images meet a criterion for the detection and/or recognition of the relevant information and/or if there are missing images for said detection and recognition.

19. The method according to claim 15, wherein the step of detecting and recognizing the relevant information comprises the detection of the relevant information to be executed by the mobile robot,. using processing unit(s) arranged in said robot in real time, wherein the detected relevant information is then sent through the robot's communications means to a remote server for the recognition of the relevant information.

20. The method according to claim 15, wherein the step of processing the detected and recognized relevant information comprises further processing the recognized information in order to filter, consolidate and send the information to the end user(s), wherein low confidence information is set aside, the recognized information is corrected based on redundant information, and the recognized information coming from more than one captured image is consolidated in a single result.

21. A method or automatically monitoring the state of shelvesin stores through a robotic system, the method comprising:

starting a travel of a mobile robot in a store to monitor the state of the shelves;

autonomously navigating by the mobile robot the aisles of the store, said navigation being configured to ensure a desired coverage of the store using multi-target planning and navigation systems to direct the robot in real time, while incorporating obstacle-avoiding capability and route replanning;

capturing images, by the robot, while navigating the store, to get relevant information on the product shelves that require supervision or monitoring using the robot's capture sensors and the processing unit(s);

detecting and recognizing the relevant information contained in the captured images using deep-learning detection and recognition algorithms;

processing the detected and recognized relevant information and communicating the processed information through the robot's communications means to an end user using generated reports and/or alarms.

* * * * *